US009249740B2

(12) United States Patent
Matsuda et al.

(10) Patent No.: US 9,249,740 B2
(45) Date of Patent: Feb. 2, 2016

(54) CONTROL DEVICE FOR INTERNAL COMBUSTION ENGINE

(75) Inventors: Kazuhisa Matsuda, Susono (JP); Kouji Morita, Mishima (JP); Takahiko Fujiwara, Shizuoka-ken (JP); Takahiro Tsukagoshi, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/383,963

(22) PCT Filed: Mar. 22, 2012

(86) PCT No.: PCT/JP2012/057357
§ 371 (c)(1),
(2), (4) Date: Feb. 4, 2015

(87) PCT Pub. No.: WO2013/140577
PCT Pub. Date: Sep. 26, 2013

(65) Prior Publication Data
US 2015/0152793 A1 Jun. 4, 2015

(51) Int. Cl.
*F01N 3/00* (2006.01)
*F02D 13/02* (2006.01)
(Continued)

(52) U.S. Cl.
CPC .......... *F02D 13/0203* (2013.01); *F01N 3/2006* (2013.01); *F02D 13/0215* (2013.01); *F02D 15/00* (2013.01); *F02D 17/00* (2013.01); *F02D 19/084* (2013.01); *F02D 19/087* (2013.01); *F02D 41/0245* (2013.01); *F02D 41/123* (2013.01); *F02B 2075/125* (2013.01); *F02D 2041/001* (2013.01); *F02D 2200/021* (2013.01); *F02D 2200/0802* (2013.01); *Y02T 10/12* (2013.01); *Y02T 10/18* (2013.01); *Y02T 10/26* (2013.01); *Y02T 10/36* (2013.01)

(58) Field of Classification Search
USPC ......... 60/276, 277, 285, 286; 123/90.15, 480, 123/492, 493, 672, 676
See application file for complete search history.

(56) References Cited

U.S. PATENT DOCUMENTS 6,345,499 B1 * 2/2002 Nishimura .............. F02D 37/02
123/295
6,856,889 B2 * 2/2005 Nagaishi ............... F02D 35/025
123/435

(Continued)

FOREIGN PATENT DOCUMENTS

JP 2000-087769 A 3/2000
JP 2006-097602 A 4/2006
(Continued)

*Primary Examiner* — Binh Q Tran
(74) *Attorney, Agent, or Firm* — Kenyon & Kenyon LLP

(57) ABSTRACT

An engine includes variable valve mechanisms and a variable compression ratio mechanism. An ECU executes temperature balance control when a fuel-cut operation is executed. In the temperature balance control, valve opening characteristics of an exhaust valve are controlled based on a magnitude relation between an actual catalyst temperature and a target catalyst temperature and a magnitude relation between a water temperature and a required cylinder wall temperature. When executing a fuel-cut operation, it is thereby possible to control both the actual catalyst temperature and the water temperature in a well-balanced manner so that the actual catalyst temperature falls within a temperature range suitable for operation of the catalysts, and the water temperature becomes close to the required cylinder wall temperature.

10 Claims, 12 Drawing Sheets

(51) Int. Cl.
*F02D 17/00* (2006.01)
*F02D 15/00* (2006.01)
*F02D 19/08* (2006.01)
*F02D 41/02* (2006.01)
*F02D 41/12* (2006.01)
*F01N 3/20* (2006.01)
*F02B 75/12* (2006.01)
*F02D 41/00* (2006.01)

(56) References Cited

U.S. PATENT DOCUMENTS 6,901,744 B2 * 6/2005 Kako ............... F01N 11/007
60/276

6,957,529 B2 * 10/2005 Iihoshi ............... F02D 41/0235
60/284
6,990,968 B2 * 1/2006 Nagaishi ............... F02D 41/047
123/480
7,716,919 B2 * 5/2010 Murase ............... F01N 3/08
60/274

FOREIGN PATENT DOCUMENTS

| | | |
|---|---|---|
| JP | 2006-342680 A | 12/2006 |
| JP | 2007-016710 A | 1/2007 |
| JP | 2007-132326 A | 5/2007 |
| JP | 2009-079517 A | 4/2009 |
| JP | 2012-007591 A | 1/2012 |

* cited by examiner

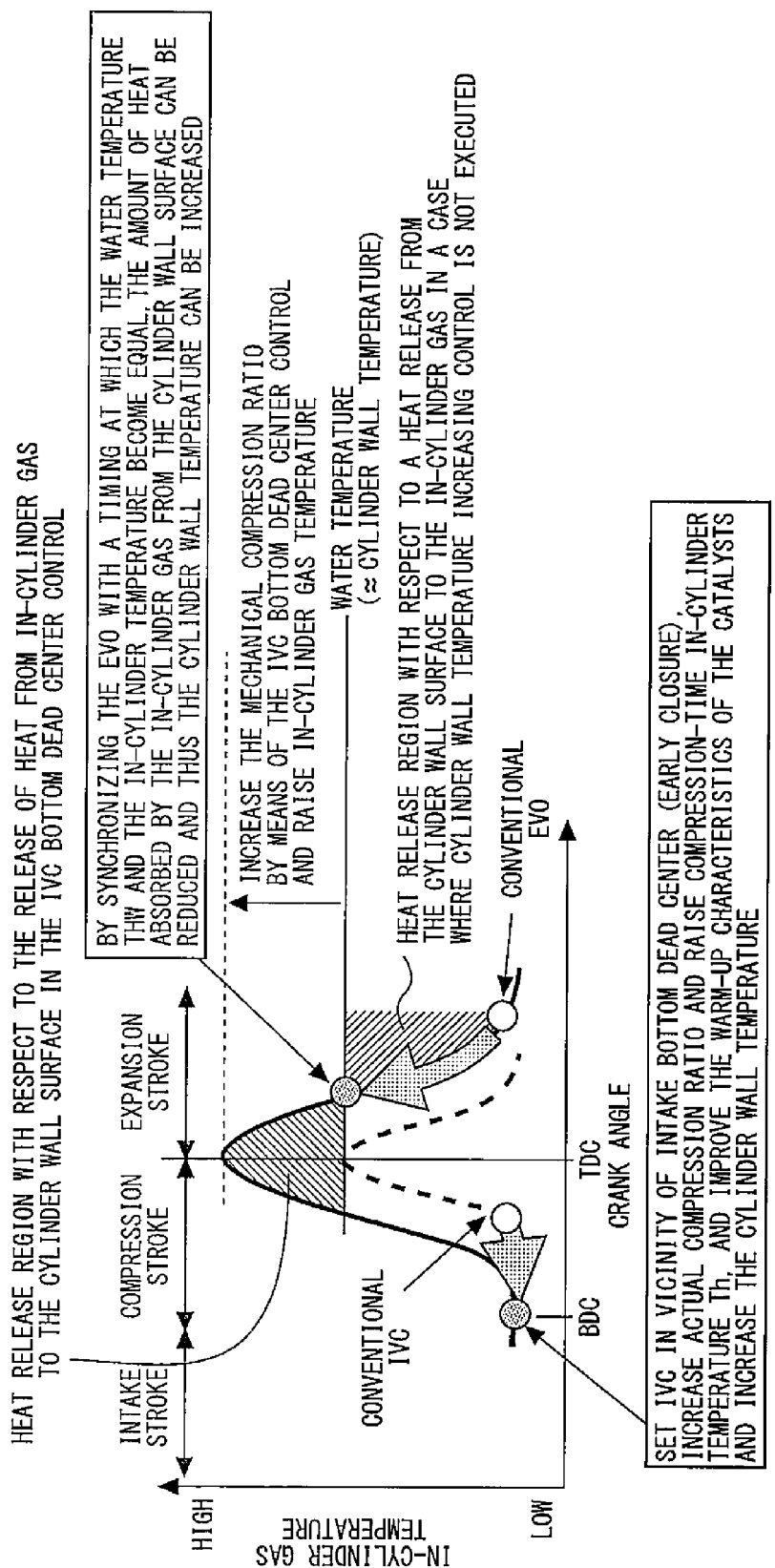

CONTROL DEVICE FOR INTERNAL COMBUSTION ENGINE

CROSS-REFERENCE TO RELATED APPLICATIONS

This is a national phase application based on the PCT International Patent Application No. PCT/JP2012/057357 filed Mar. 22, 2012, the entire contents of which are incorporated herein by reference.

TECHNICAL FIELD

The present invention relates to a control device for an internal combustion engine, and more particularly to a control device for an internal combustion engine that controls a valve timing during a fuel-cut operation.

BACKGROUND ART

The conventional technology includes a control device for an internal combustion engine that controls a valve timing during a fuel-cut operation as disclosed, for example, in Patent Literature 1 (Japanese Patent Laid-Open No. 2009-79517). According to the conventional technology, if it is predicted that a catalyst will enter a supercooled state during a fuel-cut operation, an opening timing or a closing timing of an exhaust valve is controlled to an advance side. As a result, according to the conventional technology, heat around a combustion chamber is efficiently transferred to air (fresh air) that flows into a cylinder during a fuel-cut operation, and a decrease in the catalyst temperature is suppressed by increasing the temperature of the fresh air.

The applicants are aware of the following literature, which includes the above described literature, as literature related to the present invention.

CITATION LIST

Patent Literature

Patent Literature 1: Japanese Patent Laid-Open No. 2009-79517
Patent Literature 2: Japanese Patent Laid-Open No. 2006-342680
Patent Literature 3: Japanese Patent Laid-Open No. 2007-132326
Patent Literature 4: Japanese Patent Laid-Open No. 2000-87769
Patent Literature 5: Japanese Patent Laid-Open No. 2007-16710
Patent Literature 6: Japanese Patent Laid-Open No. 2006-97602
Patent Literature 7: Japanese Patent Laid-Open No. 2012-7591

SUMMARY OF INVENTION

Technical Problem

According to the above described conventional technology, a configuration is adopted in which, by controlling valve timings during a fuel-cut operation, heat around a combustion chamber is transferred to a catalyst using fresh air that flows into a cylinder as a medium. However, in a case where the wall surface temperature of the combustion chamber is low, conduction of heat to the fresh air does not occur, and furthermore, the heat of the fresh air that was heated by compression in the cylinder is absorbed by the wall surface of the combustion chamber. In this case, according to the control of the conventional technology, since the temperature of the fresh air does not rise, there is the problem that a decrease in the catalyst temperature cannot be adequately suppressed. On the other hand, in a case where heat around a combustion chamber is transferred to an excessive degree to the fresh air, since there is an excessive decrease in the temperature of the combustion chamber, it is difficult for fuel to vaporize in the combustion chamber when reverting from the fuel-cut operation and there is a concern that the combustibility will deteriorate. In particular, these problems are liable to be noticeable when using an alcohol fuel.

The present invention has been conceived to solve the above described problems, and an object of the present invention is to provide a control device for an internal combustion engine that, when executing a fuel-cut operation, can improve the combustibility while maintaining an exhaust purification catalyst at an appropriate temperature.

Means for Solving the Problem

A first aspect of the present invention is a control device for internal combustion engine, comprising:

an exhaust purification catalyst that purifies exhaust gas that is discharged from a cylinder of the internal combustion engine;

an exhaust valve timing varying mechanism for variably setting valve opening characteristics of an exhaust valve;

catalyst temperature acquisition means for detecting or estimating a temperature of the exhaust purification catalyst as an actual catalyst temperature;

target catalyst temperature setting means for setting a catalyst temperature that is suitable for operation of the exhaust purification catalyst as a target catalyst temperature;

cylinder wall temperature detection means for detecting a cylinder wall temperature that is a wall surface temperature of the cylinder;

required cylinder wall temperature calculation means for calculating a cylinder wall temperature that is required when reverting from a fuel-cut operation as a required cylinder wall temperature; and temperature balance control means for controlling the valve opening characteristics of the exhaust valve by means of the exhaust valve timing varying mechanism based on a magnitude relation between the actual catalyst temperature and the target catalyst temperature and a magnitude relation between the cylinder wall temperature and the required cylinder wall temperature at a time that a fuel-cut operation is executed.

A second aspect of the present invention, further comprising:

alcohol concentration detection means for detecting an alcohol concentration in a fuel;

wherein the required cylinder wall temperature calculation means is configured so that the higher the alcohol concentration in the fuel is, the higher a temperature that is calculated as the required cylinder wall temperature will be.

A third aspect of the present invention, wherein:

the target catalyst temperature is set so as to include a predetermined activity decreasing temperature that corresponds to a lower limit value of a range of catalyst temperatures at which the exhaust purification catalyst is activated; and the temperature balance control means comprises low catalyst temperature and high cylinder temperature-time control means for setting an opening timing of the exhaust valve to immediately after a compression top dead center in a case where the actual catalyst temperature is lower than the activity decreasing temperature and the cylinder wall temperature is higher than the required cylinder wall temperature.

A fourth aspect of the present invention, further comprising:

an intake valve timing varying mechanism for variably setting valve opening characteristics of an intake valve;

wherein the temperature balance control means comprises very low catalyst temperature-time control means for, in a case where a temperature difference between the actual catalyst temperature and the activity decreasing temperature is greater than a predetermined large temperature difference determination value, setting a closing timing of the intake valve in a vicinity of an intake bottom dead center by means of the intake valve timing varying mechanism.

A fifth aspect of the present invention, further comprising:

a variable compression ratio mechanism that is capable of variably setting a mechanical compression ratio of the cylinder;

wherein the temperature balance control means comprises temperature increasing means for, in a case where the actual catalyst temperature is lower than the activity decreasing temperature and the cylinder wall temperature is lower than the required cylinder wall temperature, increasing the mechanical compression ratio by means of the variable compression ratio mechanism to increase a gas temperature in the cylinder and the cylinder wall temperature.

A sixth aspect of the present invention, wherein:

the temperature balance control means comprises temperature increasing means for, in a case where the actual catalyst temperature is lower than the activity decreasing temperature and the cylinder wall temperature is lower than the required cylinder wall temperature, setting a closing timing of the intake valve in a vicinity of an intake bottom dead center and increasing a gas temperature in the cylinder and the cylinder wall temperature.

A seventh aspect of the present invention, further comprising:

in-cylinder temperature estimation means for estimating an in-cylinder temperature that is a temperature in the cylinder at a compression top dead center based on at least an alcohol concentration in a fuel;

wherein the temperature balance control means comprises cylinder wall temperature increasing means for setting an opening timing of the exhaust valve to a timing at which the cylinder wall temperature and the in-cylinder temperature become equal.

An eighth aspect of the present invention, wherein:

the target catalyst temperature is set so as to include a predetermined catalyst deterioration temperature that corresponds to a lower limit value of a catalyst temperature range in which deterioration of the exhaust purification catalyst progresses; and the temperature balance control means comprises exhaust gas temperature decrease priority means for, in a case where the actual catalyst temperature is equal to or greater than the catalyst deterioration temperature and the cylinder wall temperature is higher than the required cylinder wall temperature, setting an opening timing of the exhaust valve to a timing at which the cylinder wall temperature and the in-cylinder temperature become equal.

A ninth aspect of the present invention, further comprising:

a variable compression ratio mechanism for variably setting a mechanical compression ratio of the cylinder;

wherein the temperature balance control means comprises temperature adjustment means for, in a case where the actual catalyst temperature is equal to or greater than the catalyst deterioration temperature and the cylinder wall temperature is lower than the required cylinder wall temperature, increasing the mechanical compression ratio by means of the variable compression ratio mechanism to increase the cylinder wall temperature and decrease an exhaust gas temperature.

A tenth aspect of the present invention, further comprising:

an intake valve timing varying mechanism for variably setting valve opening characteristics of an intake valve;

wherein the temperature balance control means comprises in-cylinder temperature increasing means for, in a case where the actual catalyst temperature is greater than or equal to the catalyst deterioration temperature and the cylinder wall temperature is lower than the required cylinder wall temperature, setting a closing timing of the intake valve in a vicinity of an intake bottom dead center by means of the intake valve timing varying mechanism.

Advantageous Effects of Invention

According to the first invention, both the actual catalyst temperature and the cylinder wall temperature can be controlled in a well-balanced manner so that the actual catalyst temperature becomes a temperature that is suited to the operation of the exhaust purification catalyst, and the cylinder wall temperature becomes close to the required cylinder wall temperature. Accordingly, at the time of a fuel-cut operation, it is possible to suppress the occurrence of a situation in which the catalyst becomes a high temperature and deteriorates or in which the catalyst becomes a low temperature and the exhaust gas emissions deteriorate. Further, deterioration of the combustion state after a fuel-cut operation that is due to the cylinder wall temperature decreasing excessively can also be suppressed.

According to the second invention, in a case where the alcohol concentration in a fuel is high and the combustion temperature or cylinder wall temperature is liable to decrease, the required cylinder wall temperature is calculated as a high temperature, and the cylinder wall temperature can be raised in accordance with the calculation result. Thus, the cylinder wall temperature can be appropriately controlled in accordance with the alcohol concentration in the fuel.

According to the third invention, in a case where the actual catalyst temperature is lower than the activity decreasing temperature and the cylinder wall temperature is higher than the required cylinder wall temperature, that is, in a case where it is desired to give priority to increasing the exhaust gas temperature rather than to maintaining the cylinder wall temperature, the opening timing of the exhaust valve can be set to immediately after the compression top dead center. It is thereby possible to raise the temperature of exhaust gas supplied to the catalyst and improve the warm-up characteristics of the catalyst.

According to the fourth invention, in a case where the actual catalyst temperature is significantly lower than the activity decreasing temperature, the closing timing of the intake valve can be set in the vicinity of the intake bottom dead center. It is thereby possible to increase the in-cylinder temperature at the compression top dead center and raise the exhaust gas temperature to further improve the warm-up characteristics of the catalyst.

According to the fifth invention, in a case where the actual catalyst temperature is lower than the activity decreasing temperature and the cylinder wall temperature is lower than the required cylinder wall temperature, the mechanical compression ratio can be increased by means of the variable compression ratio mechanism. It is thereby possible to raise the in-cylinder temperature at the compression top dead center and increase the cylinder wall temperature by increasing the cooling loss. Further, the exhaust gas temperature can also be raised together with the in-cylinder gas temperature, and the warm-up characteristics of the catalyst can be improved.

According to the sixth invention, in a case where the actual catalyst temperature and the cylinder wall temperature are low, the closing timing of the intake valve can be set in the vicinity of the intake bottom dead center, and the gas temperature in the cylinder and the cylinder wall temperature can be increased. It is thereby possible to also improve the warm-up characteristics of the catalyst.

According to the seventh invention, by synchronizing the opening timing of the exhaust valve with a timing at which the cylinder wall temperature and the in-cylinder temperature become equal, the amount of heat absorbed by the in-cylinder gas from the cylinder wall surface can be reduced and the cylinder wall temperature can be raised. At such time, since the alcohol concentration in the fuel is reflected in the estimated value of the in-cylinder temperature, in a case where the alcohol concentration is high, the amount by which the cylinder wall temperature rises can be increased and the cylinder wall temperature can be appropriately controlled in accordance with the alcohol concentration.

According to the eighth invention, in a case where the actual catalyst temperature is equal to or greater than the catalyst deterioration temperature and the cylinder wall temperature is also higher than the required cylinder wall temperature, the opening timing of the exhaust valve can be advanced to a timing at which the cylinder wall temperature and the in-cylinder temperature become equal. Thus, the amount of heat absorbed by the in-cylinder gas from the cylinder wall surface can be reduced, and the temperature of the in-cylinder gas and the temperature of the exhaust gas can be lowered relatively. As a result, the catalyst temperature can be lowered and deterioration of the catalyst can be suppressed.

According to the ninth invention, in a case where the actual catalyst temperature is equal to or greater than the catalyst deterioration temperature, and the cylinder wall temperature is lower than the required cylinder wall temperature, the mechanical compression ratio can be increased by means of the variable compression ratio mechanism, and the cylinder wall temperature can be raised to relatively lower the exhaust gas temperature. It is thereby possible to protect the catalyst from deterioration caused by a high temperature.

According to the tenth invention, in a case where the actual catalyst temperature is equal to or greater than the catalyst deterioration temperature and the cylinder wall temperature is lower than the required cylinder wall temperature, the closing timing of the intake valve can be set in the vicinity of the intake bottom dead center and the actual compression ratio can be increased. Thus, the in-cylinder gas temperature can be raised and the warm-up characteristics of the catalyst can be improved and the cylinder wall temperature can be increased.

BRIEF DESCRIPTION OF DRAWINGS

FIG. 14 is an explanatory view that illustrates changes in the in-cylinder gas temperature in a case where the IVC bottom dead center control was executed at the time of a high catalyst temperature.

DESCRIPTION OF EMBODIMENT

Embodiment 1

Configuration of Embodiment 1

Figure 1:
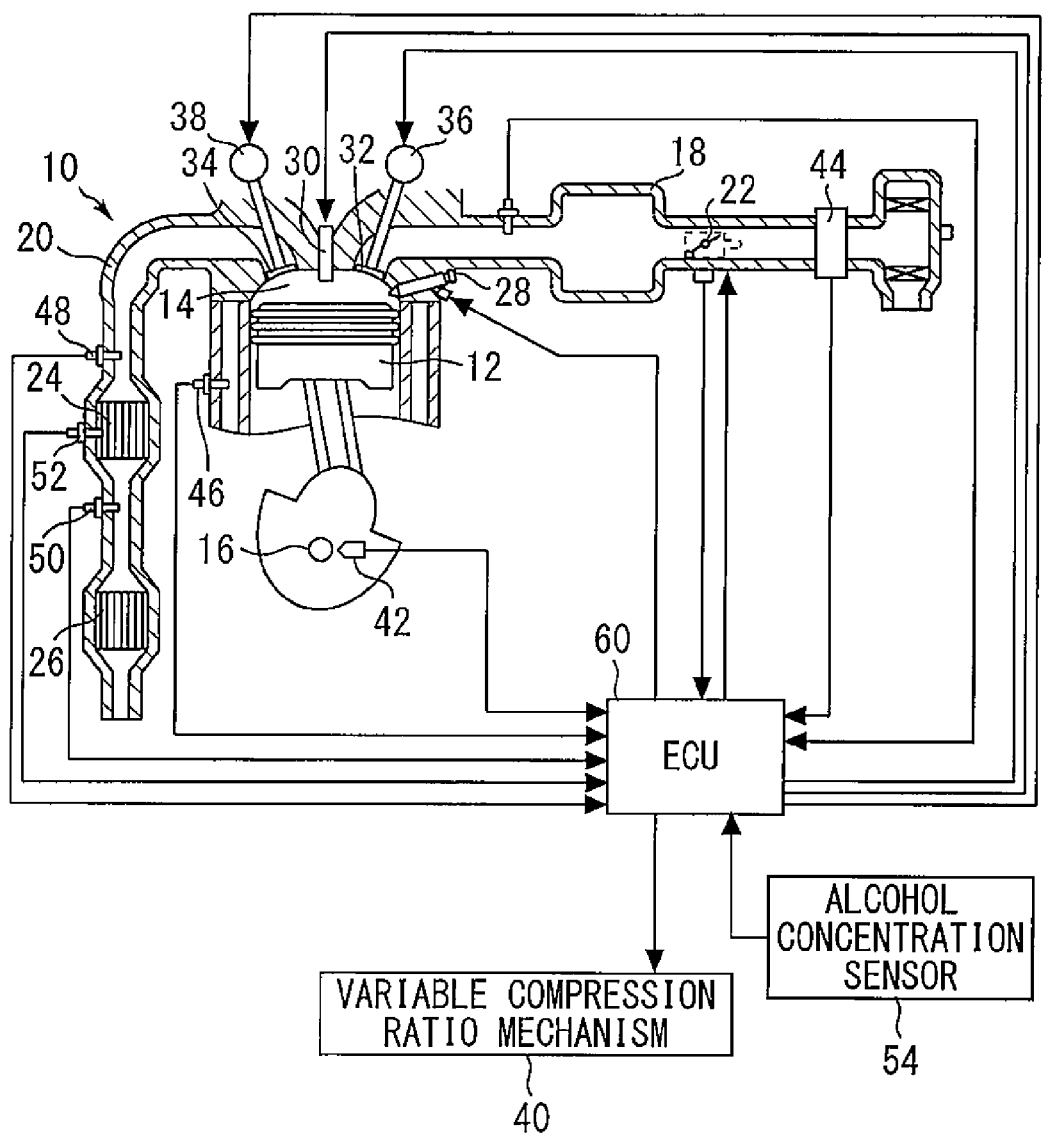
FIG. 1 is a configuration diagram for describing the system configuration of Embodiment 1 of the present invention.

Embodiment 1 of the present invention is described hereunder with reference to FIG. 1 to FIG. 14. FIG. 1 is a configuration diagram for describing the system configuration of Embodiment 1 of the present invention. The system of the present embodiment includes an engine 10 as a multi-cylinder internal combustion engine. Although only one cylinder of the engine 10 is shown in FIG. 1, the present invention may be applied to an engine with an arbitrary number of cylinders including an engine with a single cylinder. The engine 10 is mounted in a vehicle such as, for example, a FFV (Flexible Fuel Vehicle), and an alcohol fuel including ethanol or the like can be used in the engine 10.

In each cylinder of the engine 10, a combustion chamber 14 is defined by a piston 12, and the piston 12 is connected to a crankshaft 16 of the engine. The engine 10 also includes an intake passage 18 that draws intake air into each cylinder, and an exhaust passage 20 through which exhaust gas is discharged from each cylinder. An electronically controlled throttle valve 22 that adjusts an intake air amount based on a degree of accelerator opening or the like is provided in the intake passage 18. Exhaust purification catalysts 24 and 26 that purify exhaust gas are disposed in the exhaust passage 20. Three-way catalysts can be used as the catalysts 24 and 26.

Each cylinder is provided with a fuel injection valve 28 that injects fuel into the combustion chamber 14, a spark plug 30 that ignites an air-fuel mixture in the cylinder, an intake valve 32 that opens and closes the intake passage 18 with respect to the inside of the cylinder, and an exhaust valve 34 that opens and closes the exhaust passage 20 with respect to the inside of the cylinder. Further, the engine 10 is equipped with an intake variable valve mechanism 36 as an intake valve timing varying mechanism that variably sets the valve opening characteristics (opening/closing timing and phase and the like) of the intake valve 32, and an exhaust variable valve mechanism 38 as an exhaust valve timing varying mechanism that variably sets the valve opening characteristics of the exhaust valve 34. The variable valve mechanisms 36 and 38 are constituted, for example, by a swing-arm type variable valve mechanism as disclosed in Japanese Patent Laid-Open No. 2007-132326, a VVT (variable valve timing system), as disclosed in Japanese Patent Laid-Open No. 2000-87769, or an electromagnetically-driven valve mechanism as disclosed in Japanese Patent Laid-Open No. 2007-16710. Further, a working angle varying-type variable valve mechanism that is capable of changing a working angle together with the opening and closing timings of a valve as disclosed, for example, in Japanese Patent Laid-Open No. 2006-97602 may also be used as the variable valve mechanisms 36 and 38.

Further, the engine 10 includes a variable compression ratio mechanism 40 that is capable of variably setting a mechanical compression ratio of each cylinder. The variable compression ratio mechanism 40 has a known configuration as described, for example, in Japanese Patent Laid-Open No. 2012-7591. More specifically, the variable compression ratio mechanism 40 varies the mechanical compression ratio of each cylinder, that is, a value of (top dead center cylinder volume+stroke volume)/top dead center cylinder volume, by relatively moving the cylinder block and the crankcase to change a distance between the cylinder block and the crankshaft. Note that the aforementioned intake variable valve mechanism 36 and variable compression ratio mechanism 40 are not essential components in the present invention, and may be mounted only when necessary for respective control operations that are described later.

The system of the present embodiment is equipped with a sensor system that includes various sensors that are required for operation of the engine and vehicle, and an ECU (electronic control unit) 60 for controlling the operating state of the engine 10. First, the sensor system will be described. A crank angle sensor 42 outputs a signal that is synchronous with rotation of the crankshaft 16. An airflow sensor 44 detects an intake air amount, and a water temperature sensor 46 detects a water temperature Thw of engine cooling water. According to the present embodiment, the water temperature Thw is adopted as a parameter that corresponds to a wall surface temperature (cylinder wall temperature) of the cylinder (combustion chamber 14), and the water temperature sensor 46 constitutes cylinder wall temperature detection means. Further, a main air-fuel ratio sensor 48 detects an exhaust air-fuel ratio on an upstream side of the upstream catalyst 24 as a continuous value. A sub-O2 sensor 50 detects the oxygen concentration in exhaust gas between the exhaust purification catalysts 24 and 26.

A catalyst temperature sensor 52 constitutes catalyst temperature acquisition means for detecting the temperature of the exhaust purification catalyst 24 as an actual catalyst temperature Ts. Note that, according to the present invention, a configuration may also be adopted in which the catalyst temperature sensor 52 is not used, and the actual catalyst temperature is estimated based on a parameter in which the operating state of the engine is reflected (for example, an integrated value of the intake air amount, or the exhaust air-fuel ratio). An alcohol concentration sensor 54 constitutes alcohol concentration detection means for detecting an alcohol concentration in the fuel. The sensor system also includes a throttle sensor that detects a degree of throttle opening, a degree of accelerator opening sensor that detects a degree of accelerator opening, an intake air temperature sensor that detects the temperature of the intake air and the like.

The ECU 60 is constituted, for example, by an arithmetic processing apparatus that includes a storage circuit such as a ROM, a RAM, or a non-volatile memory, and an input/output circuit. The various sensors described above are connected to an input side of the ECU 60. Various actuators including the throttle valve 22, the fuel injection valve 28, the spark plug 30, the variable valve mechanisms 36 and 38, and the variable compression ratio mechanism 40 are connected to an output side of the ECU 60. The ECU 60 performs operation control by detecting operating information of the engine by means of the sensor system, and driving each actuator based on the detection result. More specifically, the ECU 60 detects the number of engine revolutions and the crank angle based on the output of the crank angle sensor 42, and calculates the engine load based on an intake air amount that is detected by the airflow sensor 44 and the number of engine revolutions. Further, the ECU 60 determines the fuel injection timing and ignition timing and the like based on a detection value of the crank angle. The ECU 60 calculates a fuel injection amount based on the intake air amount and the engine load and the like, and drives the fuel injection valve 28 as well as the spark plug 30.

In addition, for example, the ECU 60 executes a known fuel-cut operation when the engine has entered a deceleration state, and when the engine has transitioned from the deceleration state to an acceleration state the ECU 60 ends the fuel-cut operation and reverts to normal fuel injection control. In addition, the ECU 60 constitutes target catalyst temperature setting means for setting a catalyst temperature that is suited to operation of the exhaust purification catalyst 24 as a target catalyst temperature. More specifically, a predetermined catalyst deterioration temperature T1 corresponding to a lower limit value of a catalyst temperature range in which deterioration of the exhaust purification catalyst 24 progresses, and a predetermined activity decreasing temperature T2 corresponding to a lower limit value of a catalyst temperature range in which the exhaust purification catalyst 24 is activated are previously stored in the ECU 60.

Here, the catalyst deterioration temperature T1 is set to a high temperature of for example, around 800° C., and the activity decreasing temperature T2 is set to a low temperature of, for example, around 400° C. If the actual catalyst temperature Is becomes higher than the catalyst deterioration temperature T1, deterioration of the catalysts 24 and 26 will progress. Further, if the actual catalyst temperature Ts becomes lower than the activity decreasing temperature T2, the exhaust purifying capability of the catalysts will decrease. Therefore, the target catalyst temperature is set as a temperature range that is greater than or equal to the activity decreasing temperature T2 and less than or equal to the catalyst deterioration temperature T1, and the actual catalyst temperature Ts is controlled so as to fall within this temperature range ($T1 \geq Ts \geq T2$).

Features of Embodiment 1

A feature of the present embodiment is that temperature balance control is executed when a fuel-cut operation is executed. According to the temperature balance control, the actual catalyst temperature Ts and the cylinder wall temperature (according to the present embodiment, the water temperature Thw) are both controlled in a well-balanced manner so that both temperatures become close to their respective target temperatures. More specifically, the temperature balance control controls the valve opening characteristics of the intake valve 32 or the exhaust valve 34 based on a magnitude relation between the actual catalyst temperature Ts and the target catalyst temperature (the catalyst deterioration temperature T1 or the activity decreasing temperature T2) and a magnitude relation between the water temperature Thw and a required cylinder wall temperature Ty. Specific processing of the temperature balance control will be described later. First, the required cylinder wall temperature Ty used in the temperature balance control and a compression-time in-cylinder temperature Th will be described.

(Required Cylinder Wall Temperature Ty)

Figure 4:
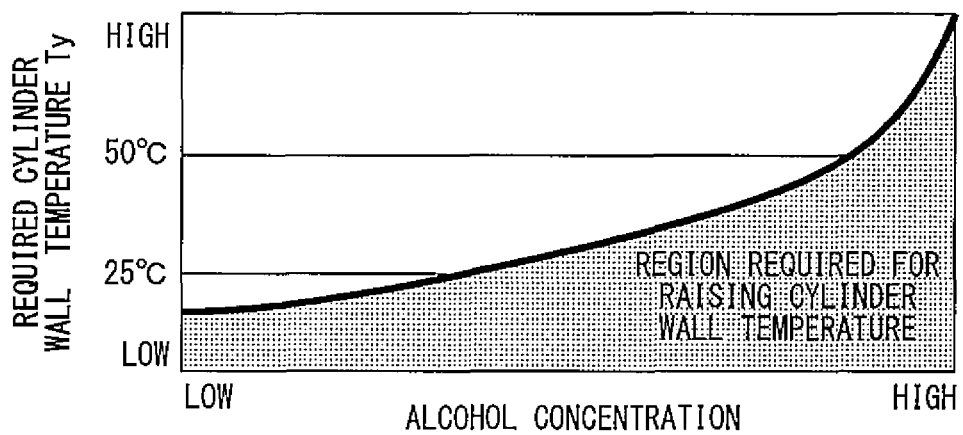
FIG. 4 is a characteristics diagram illustrating the relation between the alcohol concentration in the fuel and the required cylinder wall temperature.

The required cylinder wall temperature Ty corresponds to a target value of the cylinder wall temperature (water temperature Thw) that is required when reverting from a fuel-cut operation and, as illustrated in FIG. 4 that is described later, is calculated based on at least the alcohol concentration in the fuel. The reason for calculating the required cylinder wall temperature Ty based on the alcohol concentration is as follows. First, the required cylinder wall temperature Ty corresponds to a cylinder wall temperature at which it is possible to realize exhaust gas emissions that are equivalent to exhaust gas emissions for a non-alcohol fuel (gasoline or the like) when reverting from a fuel-cut operation. Since the boiling point of alcohol is high and it is difficult for alcohol to vaporize, NMOG emissions (total quantity of nonmethane organic gas and hydrocarbon and the like included in exhaust gas) are liable to deteriorate particularly at the time of cold starting (when the cylinder wall temperature is low). In this case, the lower that the cylinder wall temperature is, the greater the degree to which injected fuel will adhere to the wall surface of the cylinder and form a liquid film and, consequently, the exhaust gas emissions will deteriorate. Therefore, the required cylinder wall temperature Ty is calculated based on the alcohol concentration in the fuel, and as illustrated in FIG. 2, the higher the alcohol concentration in the fuel is, the higher the temperature that is set as the required cylinder wall temperature Ty.

Figure 2:
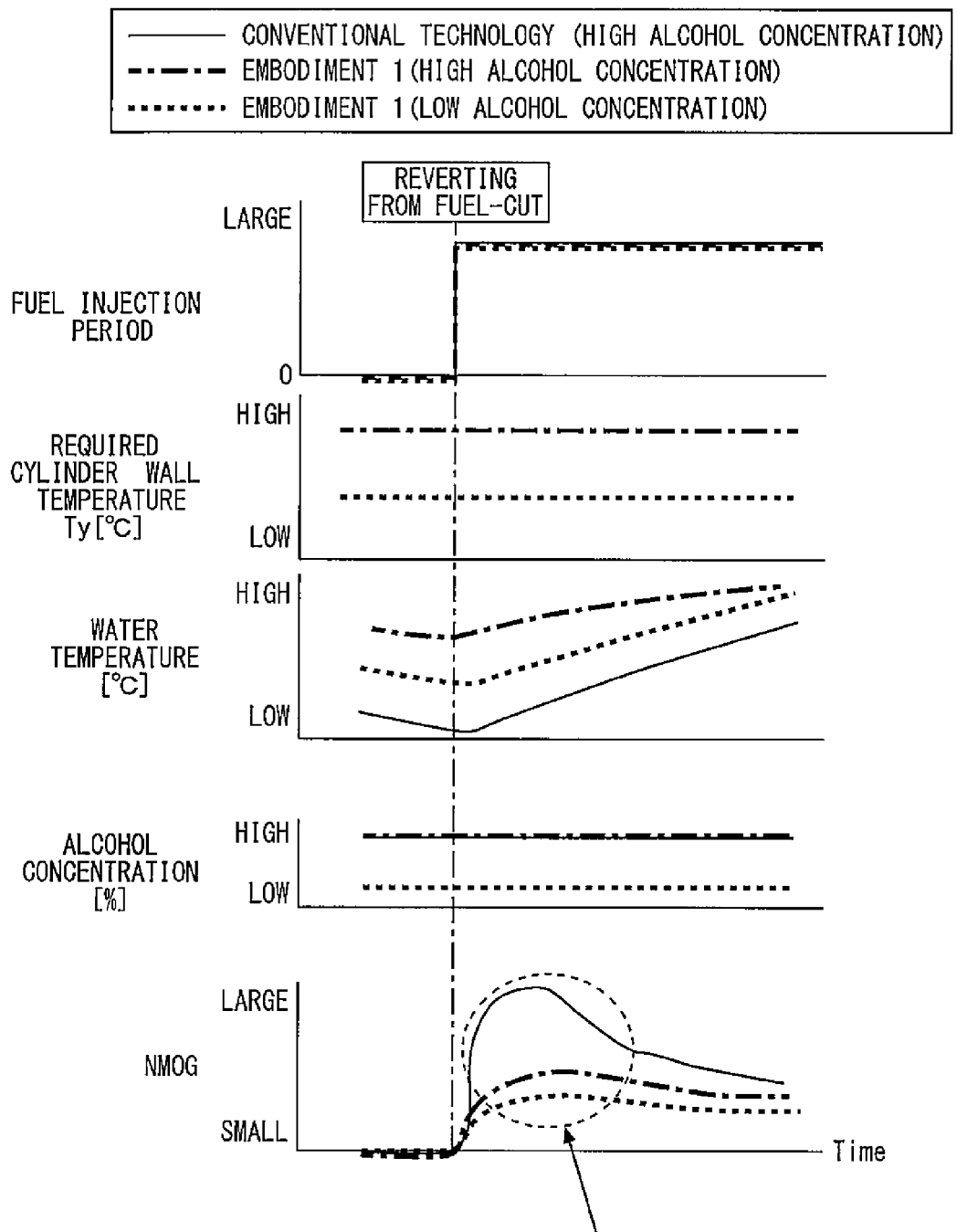
FIG. 2 is a timing chart that illustrates the states of respective control parameters when reverting from a fuel-cut operation.

FIG. 2 is a timing chart that illustrates the states of respective control parameters when reverting from a fuel-cut operation. A solid line in FIG. 2 represents control in a case where the alcohol concentration in the fuel is high according to the conventional technology. Further, an alternate long and sort dash line represents control in a case where the alcohol concentration in the fuel is high according to the present embodiment, and a dashed line represents control in a case where the alcohol concentration in the fuel is low according to the present embodiment. The fundamental concept according to the present embodiment is that the control illustrated in FIG. 2 is executed when reverting from a fuel-cut operation (FIC). That is, when reverting from a fuel-cut operation, deterioration of NMOG (HC) emissions is prevented by maintaining the cylinder wall temperature (water temperature Thw) at a high temperature. Further, since deterioration of NMOG emissions progresses when the alcohol concentration in the fuel has increased, the required cylinder wall temperature Ty is set to a high value.

Figure 3:
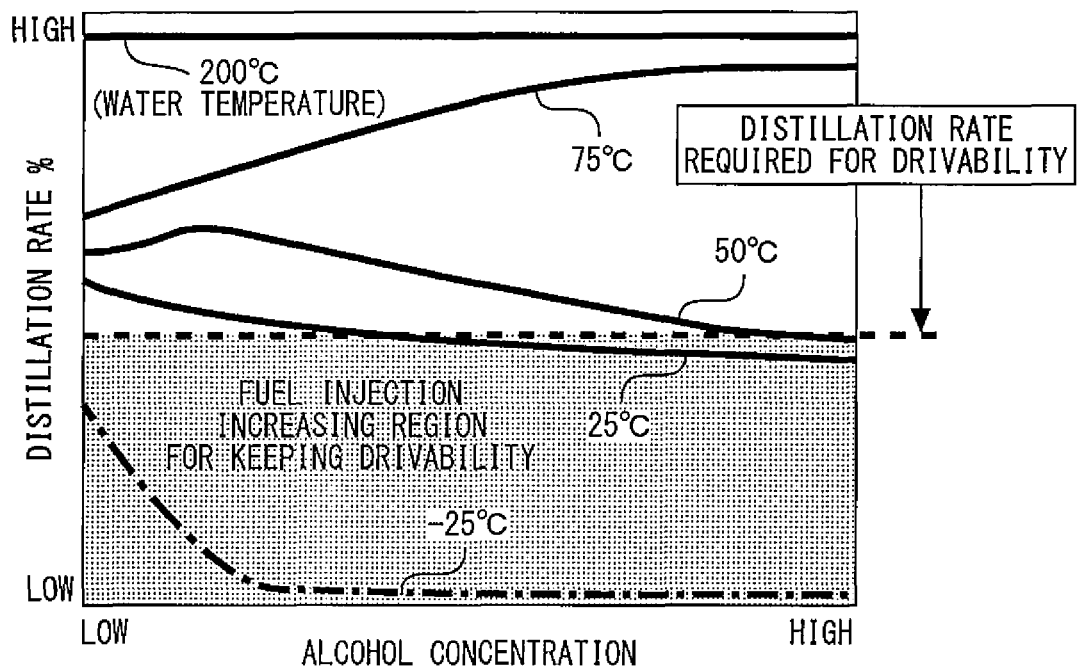
FIG. 3 is a characteristics diagram that illustrates the alcohol distillation rate at respective water temperatures and alcohol concentrations.

The required cylinder wall temperature Ty can also be set based on the following concept. In a case where the alcohol concentration in the fuel is high, it is necessary to increase the fuel injection amount in order to secure the torque by means of fuel in which the amount (concentration) of a gasoline component is small. Consequently, a larger amount of alcohol is discharged in an uncombusted state and therefore the NMOG emissions deteriorate. In this case, a rate by which to increase the fuel injection amount to secure the required torque can be calculated from the data illustrated in FIG. 3 based on the temperature of the engine (water temperature or oil temperature) and the alcohol concentration in the fuel. FIG. 3 is a characteristics diagram that illustrates the alcohol distillation rate at respective water temperatures and alcohol concentrations. As illustrated in FIG. 3, when the alcohol distillation rate that is calculated from a characteristic line in FIG. 3 based on the current water temperature and alcohol concentration is lower than a distillation rate required to ensure the drivability (distillation rate required for drivability shown in FIG. 3), it is necessary to increase the cylinder wall temperature. According to this concept, it is preferable to set the required cylinder wall temperature Ty as shown, for example, in FIG. 4 based on the alcohol concentration in the fuel. FIG. 4 is a characteristics diagram illustrating the relation between the alcohol concentration in the fuel and the required cylinder wall temperature. Accordingly, in the present embodiment, for example, the required cylinder wall temperature Ty is calculated based on the alcohol concentration in the fuel by referring to the data shown in FIG. 4 that is previously stored in the ECU 60.

(Compression-Time In-Cylinder Temperature Th)

The compression-time in-cylinder temperature Th is a parameter that corresponds to the gas temperature in the cylinder at the compression top dead center, and is estimated based on at least an alcohol concentration E1 in the fuel. More specifically, as shown in the following Equation (1), the compression-time in-cylinder temperature Th is calculated based on an estimated combustion temperature of non-alcohol fuel before a fuel-cut operation T0, a combustion temperature decrease amount $\Delta T$ that is caused by a specific heat difference between a non-alcohol fuel E0 and the fuel that is currently being used, a rate of heat flow Qcw from a cylinder wall surface to cooling water, and a specific heat difference $\Delta Cv$ that is due to a change in a volumetric efficiency (residual gas rate) that is caused by the valve timing. Note that the term "non-alcohol fuel E0" refers to gasoline or the like in which the alcohol concentration is zero.

$$Th = T0 - \Delta T - Qcw - \Delta Cv \qquad (1)$$

Figure 5:
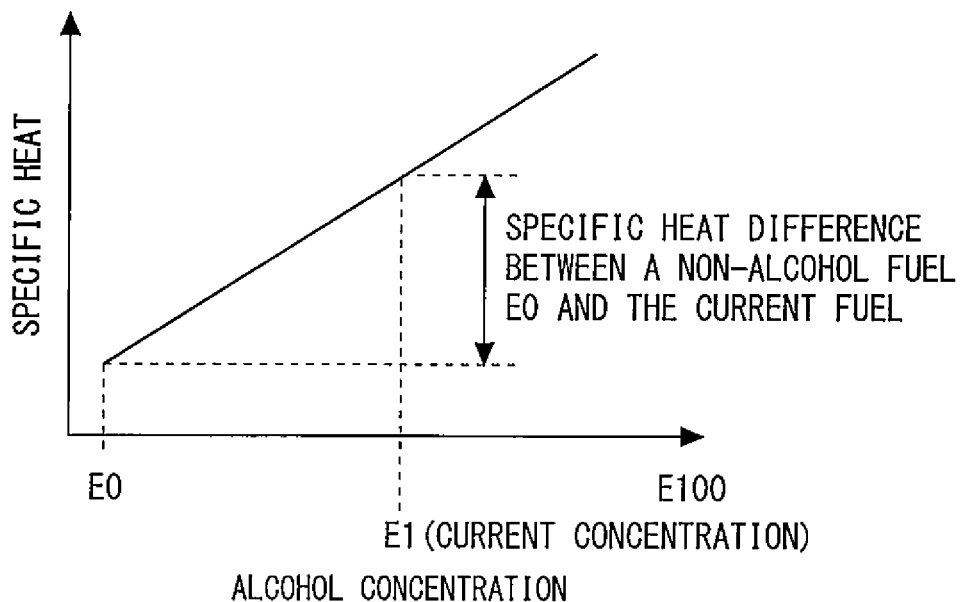
FIG. 5 is a characteristics diagram illustrating a relation between the alcohol concentration in the fuel and the specific heat.

In this equation, the estimated combustion temperature of non-alcohol fuel before a fuel-cut operation T0 represents a combustion temperature before a fuel-cut operation starts in a case in which the non-alcohol fuel E0 is used, and as one example, is calculated based on an input energy (an intake air amount Ga, a total fuel injection amount Gf or the like), the ignition timing, the water temperature Thw and the like. The combustion temperature decrease amount $\Delta T$ represents a difference in the combustion temperature between a case in which the non-alcohol fuel E0 is used and a case in which the current alcohol fuel (alcohol concentration E1) is used. The combustion temperature decrease amount $\Delta T$ is calculated based on a difference (specific heat difference) between the specific heat of the non-alcohol fuel E0 and the specific heat of an alcohol component in the fuel being used, as well as the alcohol concentration E1 in the fuel. In this case, although it is preferable to use the specific heat of the combustion gas in the processing to calculate the combustion temperature decrease amount ΔT, since the specific heat (gas component) of the combustion gas varies in accordance with the operating situation, it is difficult to identify the specific heat of the combustion gas for respective alcohol concentrations. Therefore, the combustion temperature decrease amount ΔT is calculated referring to FIG. 5 based on the specific heat difference between the specific heat of the non-alcohol fuel E0 and the specific heat of the alcohol component in the fuel being used, as well as the alcohol concentration E1 in the fuel. Note that FIG. 5 is a characteristics diagram illustrating a relation between the alcohol concentration in the fuel and the specific heat.

Figure 6:
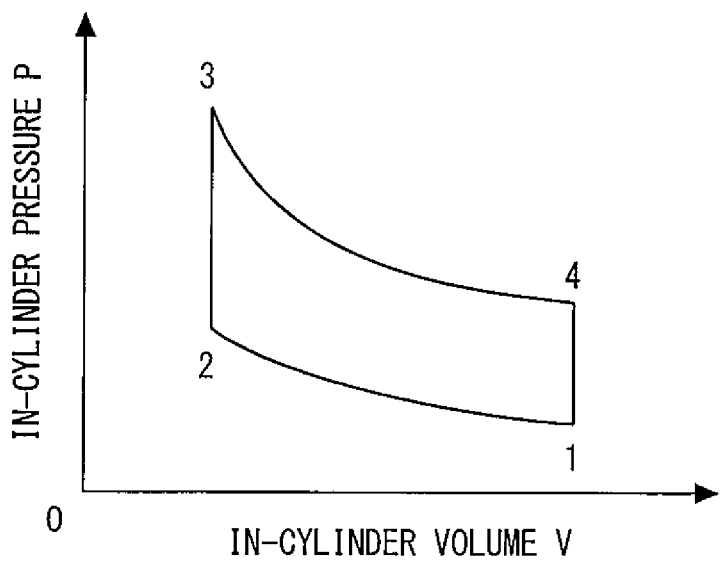
FIG. 6 is a P-V characteristics curve that illustrates one cycle of the engine.

Further, the rate of heat flow Qcw from the cylinder wall surface to the cooling water is calculated based on the following concept. FIG. 6 is a P-V characteristics curve that illustrates one cycle of the engine. In FIG. 6, because the process from 1→2 is an adiabatic compression, the following Equation (2) holds. In this equation, t1 and t2 represent in-cylinder temperatures, V1 and V2 represent in-cylinder volumes, and κ represents a ratio of specific heat.

$$t2 = t1(V1/V2)^{\kappa-1} \quad (2)$$

According to the above described Equation (2), the in-cylinder temperature at the compression top dead center at the time of a fuel-cut operation can be determined. However, in practice, since the in-cylinder temperature is influenced by a heat transfer from the in-cylinder gas to the cylinder wall surface and a specific heat difference with respect to residual gas in the cylinder, it is difficult to determine the in-cylinder temperature at the compression top dead center based on this equation. Therefore, according to the present embodiment, the rate of heat flow Qcw from the cylinder wall surface to the cooling water is determined by calculating a heat transfer coefficient hg using an empirical formula such as the Woschni expression with respect to the heat transfer shown in the following Equation (3).

$$hg = 3.26 D^{-0.2} \times P^{0.8} \times T^{-0.53} \times w^{0.8} \quad (3)$$

where, hg: spatial average instantaneous heat transfer coefficient (W/m²K)
  D: cylinder inner diameter (m)
  P: gas pressure (kPa)
  T: gas temperature (K)
  w: average piston speed (m/s)

Further, the specific heat difference ΔCv due to a change in the volumetric efficiency (residual gas rate) caused by the valve timing is calculated based on a residual gas rate that is determined by means of the valve timing before the start of the fuel-cut operation. The ECU 60 can estimate the compression-time in-cylinder temperature Th based on the above described parameters.

[Specific Processing of Temperature Balance Control]

Figure 7:
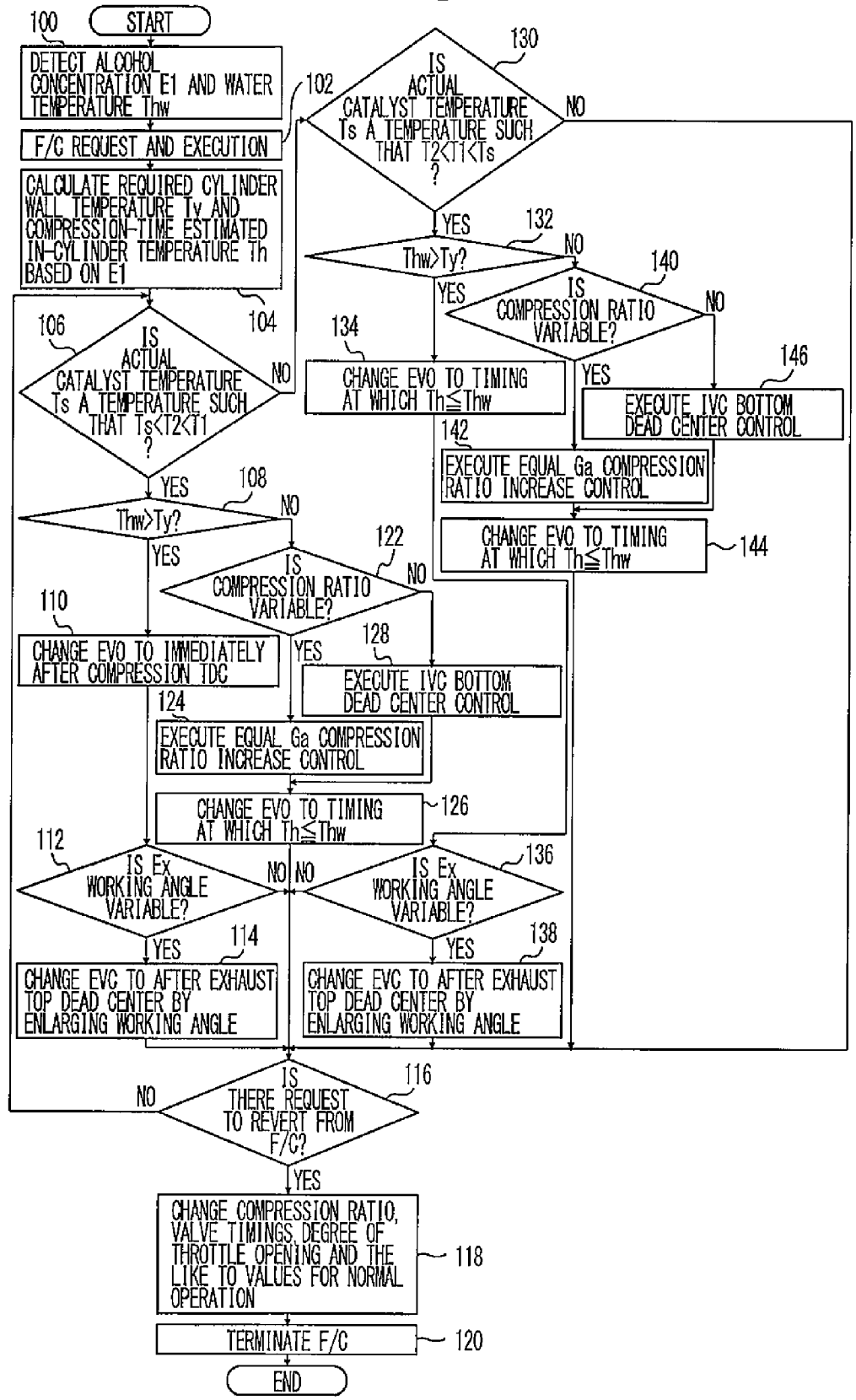
FIG. 7 is a flowchart illustrating the temperature balance control according to Embodiment 1 of the present invention.

Next, specific processing of the temperature balance control will be described referring to FIG. 7. FIG. 7 is a flowchart illustrating the temperature balance control according to Embodiment 1 of the present invention. The routine illustrated in FIG. 7 is repeatedly executed during operation of the engine. In the following description, "IVO" represents the opening timing of the intake valve 32, "IVC" represents the closing timing of the intake valve 32, "EVO" represents the opening timing of the exhaust valve 34, and "EVC" represents the closing timing of the exhaust valve 34. The above described IVO, IVC, EVO and EVC are controlled by the ECU 60 through the variable valve mechanisms 36 and 38.

In the routine shown in FIG. 7, first, in step 100, the alcohol concentration E1 in the fuel and the water temperature Thw of the engine cooling water are detected. Subsequently, in step 102, in a case where an F/C request is generated due to deceleration of the engine or the like, a fuel-cut operation is executed. Next, in step 104, as described above, the required cylinder wall temperature Ty and the compression-time in-cylinder temperature Th are calculated based on the alcohol concentration E1 in the fuel and the like.

Next, in step 106, it is determined whether or not the actual catalyst temperature Ts is lower than the activity decreasing temperature T2. If the result determined in step 106 is affirmative, in step 108, it is determines whether or not the water temperature Thw is higher than the required cylinder wall temperature Ty. If the results determined in step 106 and 108 are both affirmative, the processing shifts to step 110 that is described hereunder. Further, if the result determined in step 106 is negative, the processing shifts to step 130 that is described later, and if the result determined in step 108 is negative, the processing shifts to step 122 that is described later.

(Control in Step 110 Onward)

Figure 8:
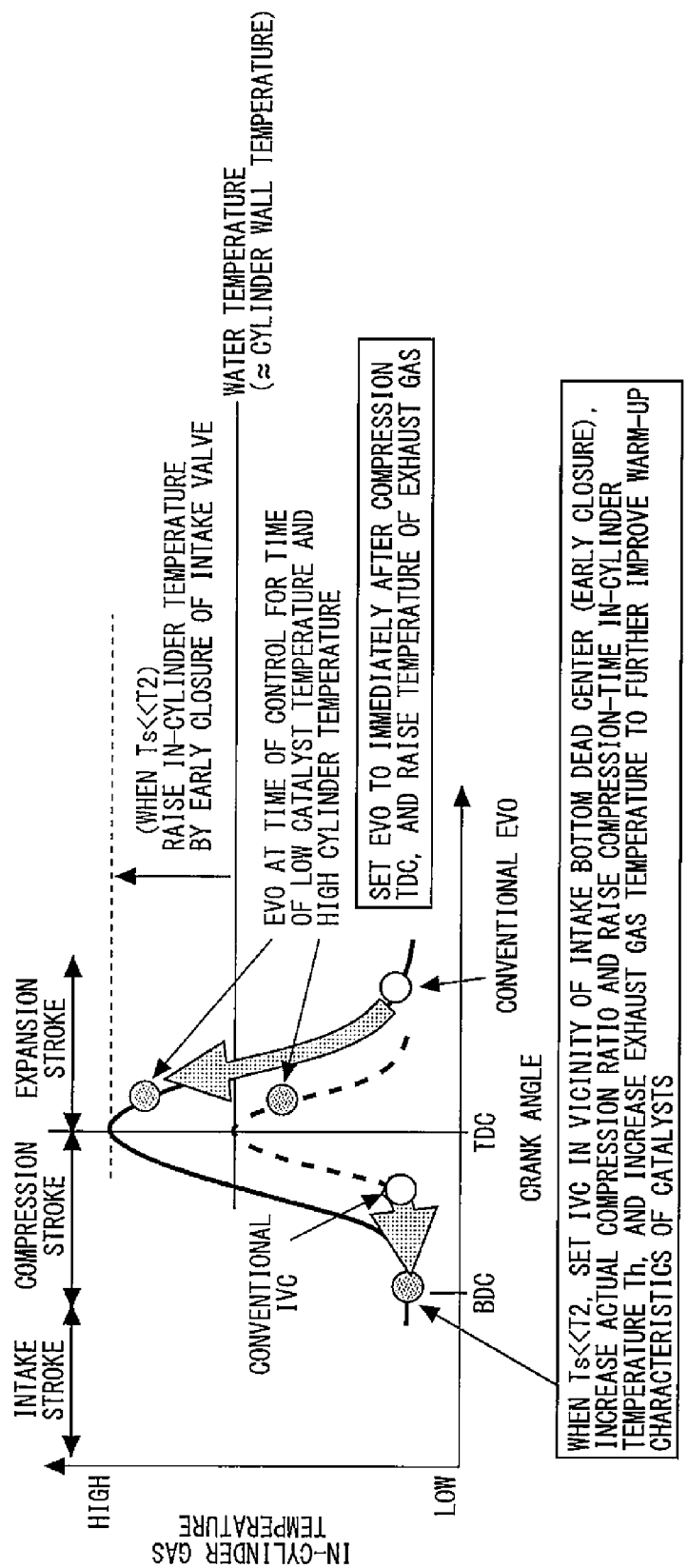
FIG. 8 is an explanatory view that illustrates changes in the in-cylinder gas temperature in a case where the control for a time of a low catalyst temperature and a high cylinder temperature was executed.

In step 110, if the actual catalyst temperature Ts is lower than the activity decreasing temperature T2 and the water temperature Thw is higher than the required cylinder wall temperature Ty, the EVO is changed to immediately after the compression top dead center (compression TDC) (control for a time of a low catalyst temperature and a high cylinder temperature). FIG. 8 is an explanatory view that illustrates changes in the in-cylinder gas temperature in a case where the control for a time of a low catalyst temperature and a high cylinder temperature was executed. In this case, since it is desired to give priority to raising the exhaust gas temperature rather than to maintaining the cylinder wall temperature, the EVO is set to immediately after the compression top dead center (to open the exhaust valve 34 early). It is thereby possible to increase the temperature of the exhaust gas that is supplied to the catalysts 24 and 26, and thereby improve the warm-up characteristics of the catalysts.

The control that varies the EVO can obtain a noticeable effect when an alcohol fuel is used. More specifically, because an alcohol fuel includes oxygen, the laminar flame speed is fast. As a result, when the alcohol concentration in the fuel increases, the rate of combustion increases and a time period in which the combustion temperature rises and falls becomes shorter. Accordingly, a change in the rate of combustion can be dealt with by changing the EVO in accordance with the alcohol concentration in the fuel. That is, for example, when it is desired to reduce the cooling loss and raise the exhaust gas temperature, or when the alcohol concentration in the fuel is high, the situation can be appropriately dealt with by advancing the EVO.

On the other hand, in a state in which conditions for executing the control for a time of a low catalyst temperature and a high cylinder temperature are established, if the actual catalyst temperature Ts is significantly lower than the activity decreasing temperature T2 (Ts<<T2), very low catalyst temperature-time control that is described hereunder may be executed. A determination as to whether or not the relation Ts<<T2 is established is made by determining whether or not a temperature difference between the actual catalyst temperature Ts and the activity decreasing temperature T2 is greater than a predetermined large temperature difference determination value. According to the very low catalyst temperature-time control, as illustrated in FIG. 8, the IVC is set in the vicinity of the intake bottom dead center (early closure), and the actual compression ratio that changes in accordance with the valve timing is increased. It is thereby possible to raise the compression-time in-cylinder temperature Th, and increase the exhaust gas temperature to further improve the warm-up characteristics of the catalysts.

Figure 9:
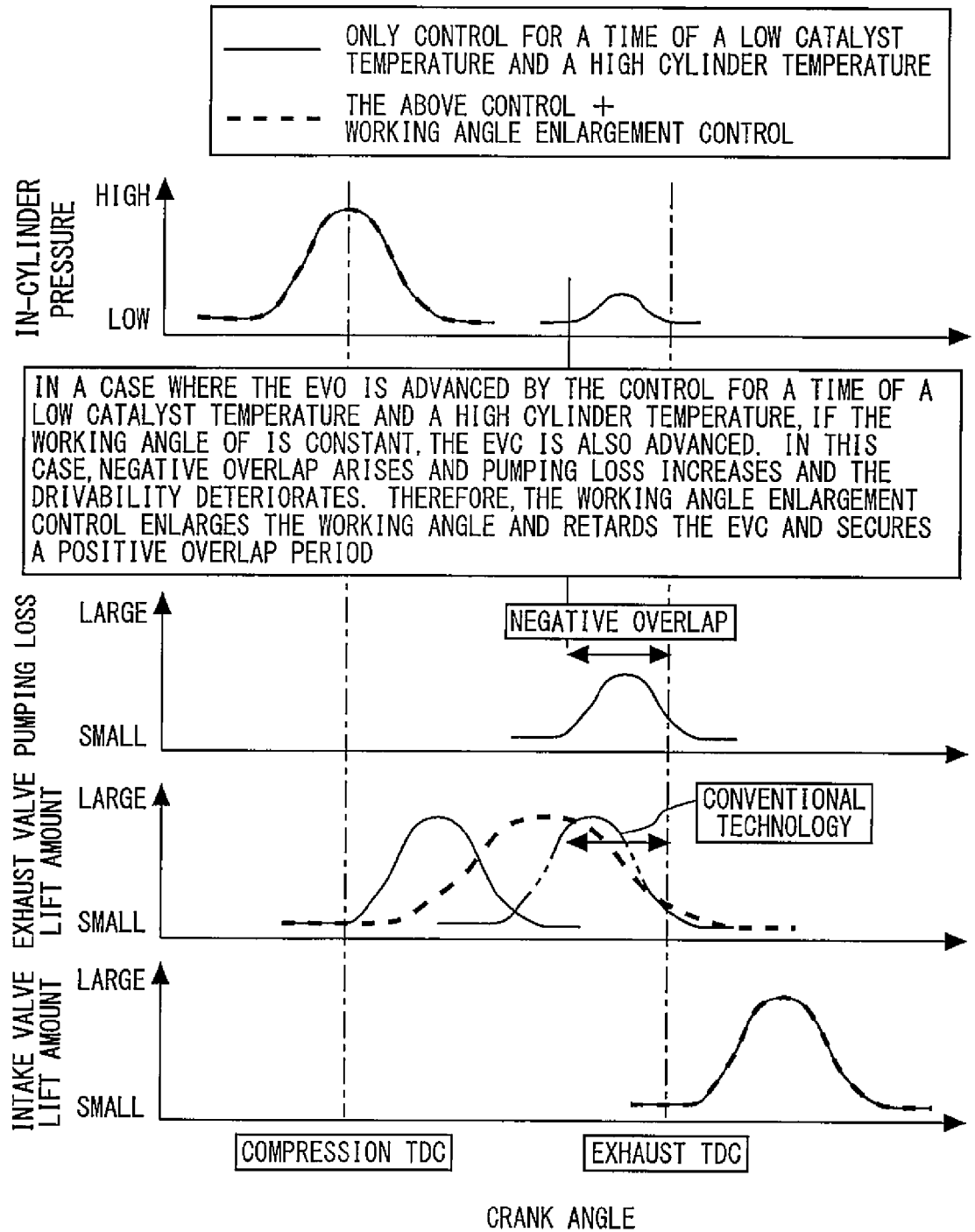
FIG. 9 is an explanatory view illustrating the contents of the working angle enlargement control.

Further, in the case of using, for example, a working angle varying-type variable valve mechanism as the exhaust variable valve mechanism 38, since the result of the determination in step 112 in FIG. 7 is affirmative, working angle enlargement control may be executed in step 114 to change the EVC to after the exhaust top dead center by enlarging the working angle. FIG. 9 is an explanatory view illustrating the contents of the working angle enlargement control. As illustrated in FIG. 7, in a case where the EVO is advanced by the control for a time of a low catalyst temperature and a high cylinder temperature, if the working angle of the exhaust valve 34 is constant, the EVC is also advanced. In this case, a period (negative overlap) arises in which both the intake valve 32 and the exhaust valve 34 close, and pumping loss increases and the drivability deteriorates. Therefore, according to the working angle enlargement control, the working angle of the exhaust valve is enlarged to retard the EVC and secure a positive overlap period. Further, if there is no risk of a valve attack in a state in which the working angle of the intake valve can also be enlarged (employing the working angle varying-type intake variable valve mechanism 36), the IVO may be advanced by an amount corresponding to the amount by which the EVO is advanced.

Further, after steps 110 to 114 in FIG. 7 are completed, in step 116 it is determined whether or not a request to revert from a fuel-cut operation has been generated. If the result of the determination in step 116 is affirmative, in step 118, the compression ratio, valve timings and degree of throttle opening and the like are changed to values for normal operation, and in step 120 the fuel-cut operation is terminated. On the other hand, if the result of the determination in step 116 is negative, the process returns to step 106 to execute processing to determine the actual catalyst temperature Ts.

(Control of Step 122 Onwards)

In a case where the result determined in step 106 is affirmative and the result determined in step 108 is negative, that is, when the actual catalyst temperature Ts is lower than the activity decreasing temperature T2 and the water temperature Thw is equal to or less than the required cylinder wall temperature Ty, the process transitions to step 122 to determine whether or not the mechanical compression ratio is variable. In a case where the variable compression ratio mechanism 40 is mounted in the engine, the result of the determination in step 122 will be affirmative, and hence equal GA compression ratio increase control is executed in step 124. The equal GA compression ratio increase control is control that increases the mechanical compression ratio by means of the variable compression ratio mechanism 40 in a state in which the intake air amount is kept constant by the throttle valve 22 and the like. According to this control, the compression-time in-cylinder temperature Th can be raised by increasing the compression ratio, and the cylinder wall temperature can be raised by increasing the cooling loss. Further, the exhaust gas temperature can also be increased together with the in-cylinder gas temperature, and the warm-up characteristics of the catalysts 24 and 26 can be increased.

Figure 10:
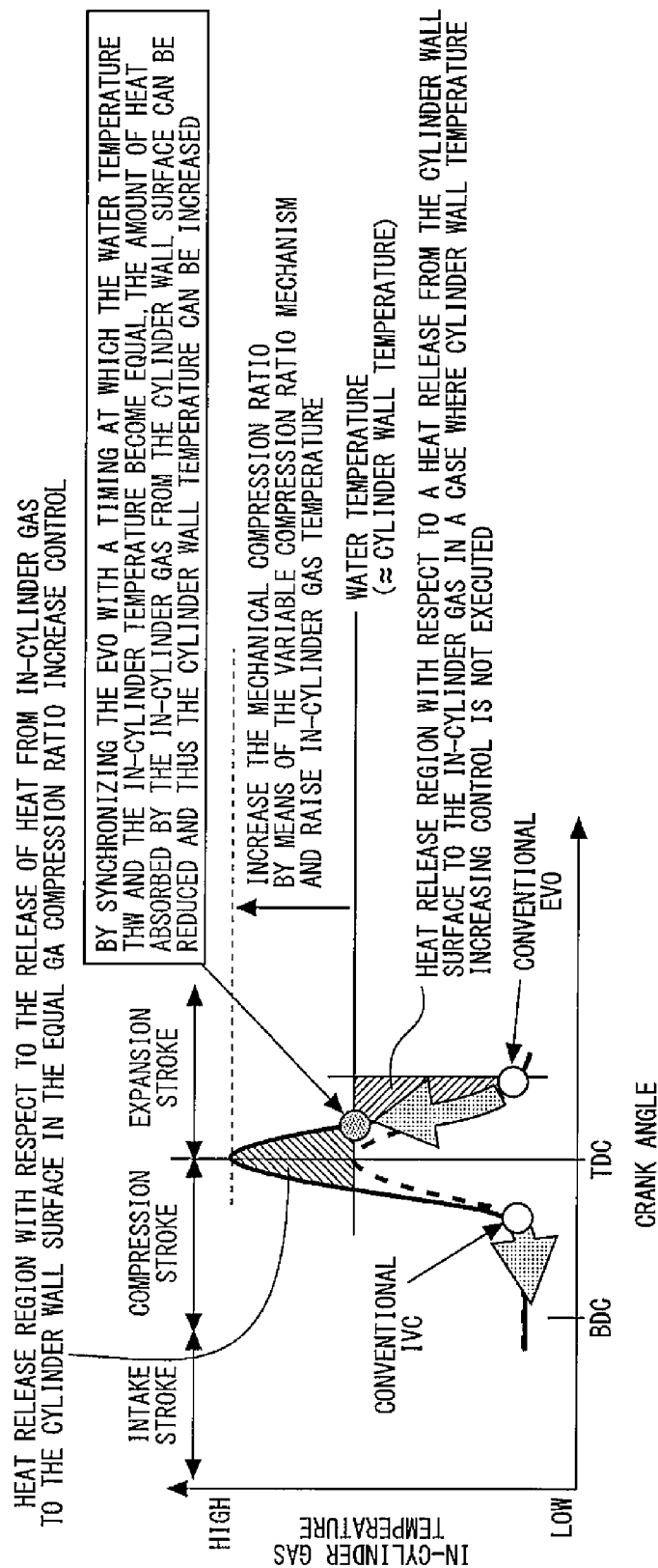
FIG. 10 is an explanatory view that illustrates changes in the in-cylinder gas temperature in a case where the cylinder wall temperature increasing control for a time of a low catalyst temperature was executed.

Next, in step 126, control is executed that changes the EVO to a timing such that Th≤Thw, that is, control is executed that synchronizes the EVO with a timing at which the water temperature Thw and the compression-time in-cylinder temperature Th become equal (cylinder wall temperature increasing control for a time of a low catalyst temperature). FIG. 10 is an explanatory view that illustrates changes in the in-cylinder gas temperature in a case where the cylinder wall temperature increasing control for a time of a low catalyst temperature was executed. In FIG. 10, a hatched portion in the vicinity of the compression top dead center indicates a heat release region with respect to the release of heat from in-cylinder gas to the cylinder wall surface in the equal GA compression ratio increase control, while a hatched portion located in the vicinity of the conventional EVO indicates a heat release region with respect to a heat release from the cylinder wall surface to the in-cylinder gas in a case where cylinder wall temperature increasing control is not executed. Note that the IVC may be set similarly to the conventional IVC. As illustrated in FIG. 10, according to the cylinder wall temperature increasing control for a time of a low catalyst temperature, by synchronizing the EVO with a timing at which the water temperature Thw and the in-cylinder temperature become equal, the amount of heat absorbed by the in-cylinder gas from the cylinder wall surface can be reduced and thus the cylinder wall temperature can be increased. Further, since the alcohol concentration in the fuel is reflected in the compression-time in-cylinder temperature Th, in a case where the alcohol concentration is high, the amount by which the cylinder wall temperature rises can be increased, and the cylinder wall temperature can be appropriately controlled in accordance with the alcohol concentration.

Figure 11:
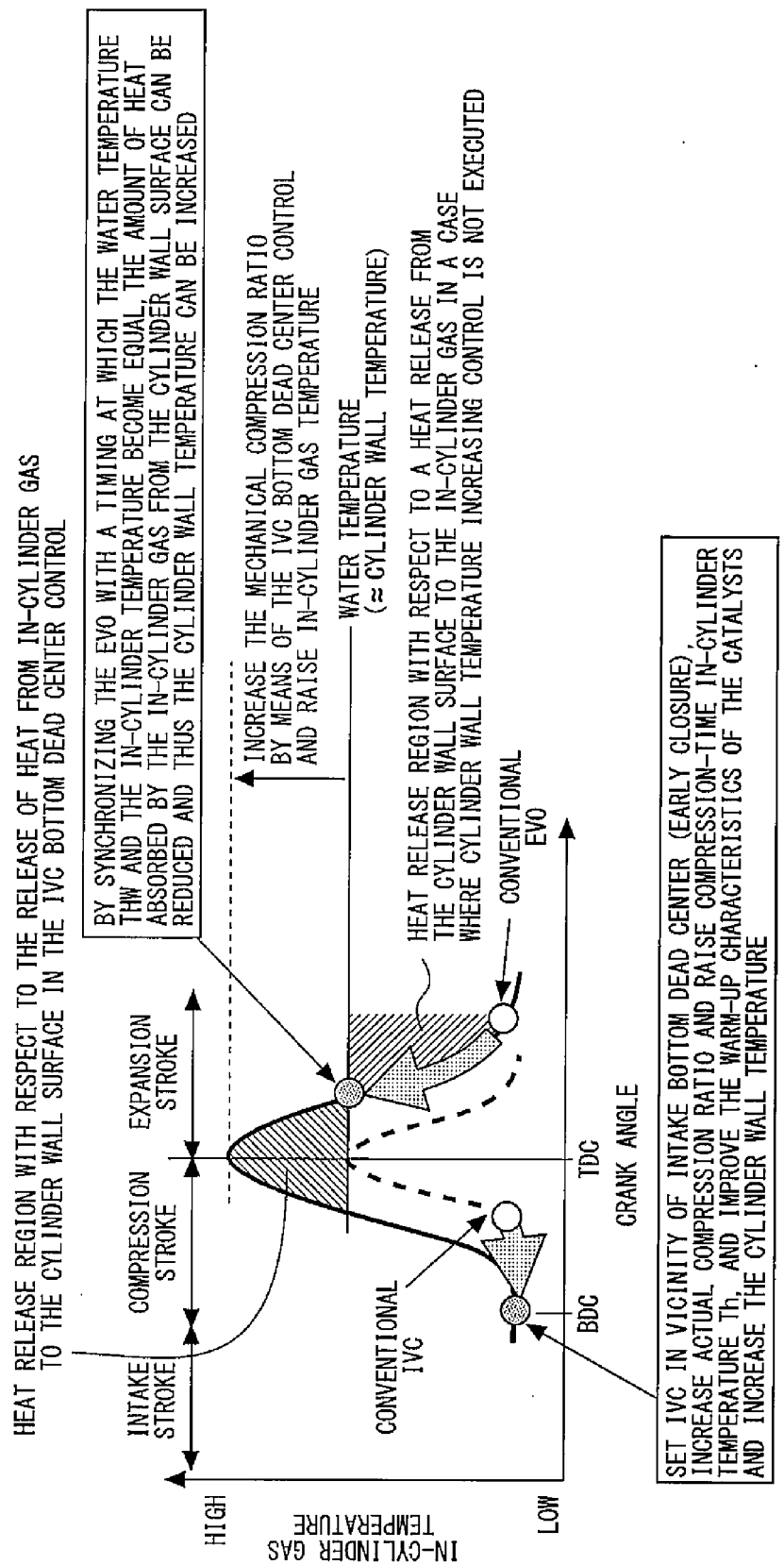
FIG. 11 is an explanatory view that illustrates changes in the in-cylinder gas temperature in a case where the IVC bottom dead center control was executed at a time of a low catalyst temperature.

Further, in a case where the result determined in step 122 is negative, that is, a case where the variable compression ratio mechanism 40 is not mounted, the process transitions to step 128 to execute IVC bottom dead center control that sets the IVC in the vicinity of the intake bottom dead center. FIG. 11 is an explanatory view that illustrates changes in the in-cylinder gas temperature in a case where the IVC bottom dead center control was executed at a time of a low catalyst temperature. In the figure, a hatched portion in the vicinity of the compression top dead center indicates a heat release region with respect to the release of heat from the in-cylinder gas to the cylinder wall surface under the IVC bottom dead center control, while the hatched portion located in the vicinity of the conventional EVO indicates a heat release region with respect to the release of heat from the cylinder wall surface to the in-cylinder gas in a case where the cylinder wall temperature increasing control is not executed. According to the IVC bottom dead center control, the actual compression ratio can be raised and the in-cylinder gas temperature increased. It is thereby possible to improve the warm-up characteristics of the catalysts and increase the cylinder wall temperature. Further, as illustrated in FIG. 11, the cylinder wall temperature increasing control for a time of a low catalyst temperature (step 126) may also be executed when executing the IVC bottom dead center control. It is thereby possible to increase the cylinder wall temperature more smoothly.

In addition, the IVC bottom dead center control can obtain a noticeable effect when using an alcohol fuel. More specifically, in comparison to when combusting gasoline or the like, when combusting an alcohol fuel, since the specific heat is large and a large amount of water is generated, the combustion temperature decreases. Further, in the case of alcohol, since the latent heat of vaporization is large and the heating value is small, for example, to maintain the same level of torque as when combusting gasoline, a fuel injection amount is required that is 1.5 times the amount required in the case of combusting gasoline. As a result, particularly in the case of injecting a high-concentration alcohol fuel when the engine is cold, a large amount of unburned fuel mixes in with oil accompanying an increase in the fuel injection amount and the in-cylinder temperature at the compression top dead center at the time of a fuel-cut operation decreases. Consequently, when using fuel having a high alcohol concentration, a decrease in the combustion temperature (in-cylinder temperature) can be effectively suppressed by increasing the compression end temperature, the actual compression ratio, and the in-cylinder temperature by means of the IVC bottom dead center control.

(Control From Step 130 Onwards)

Figure 12:
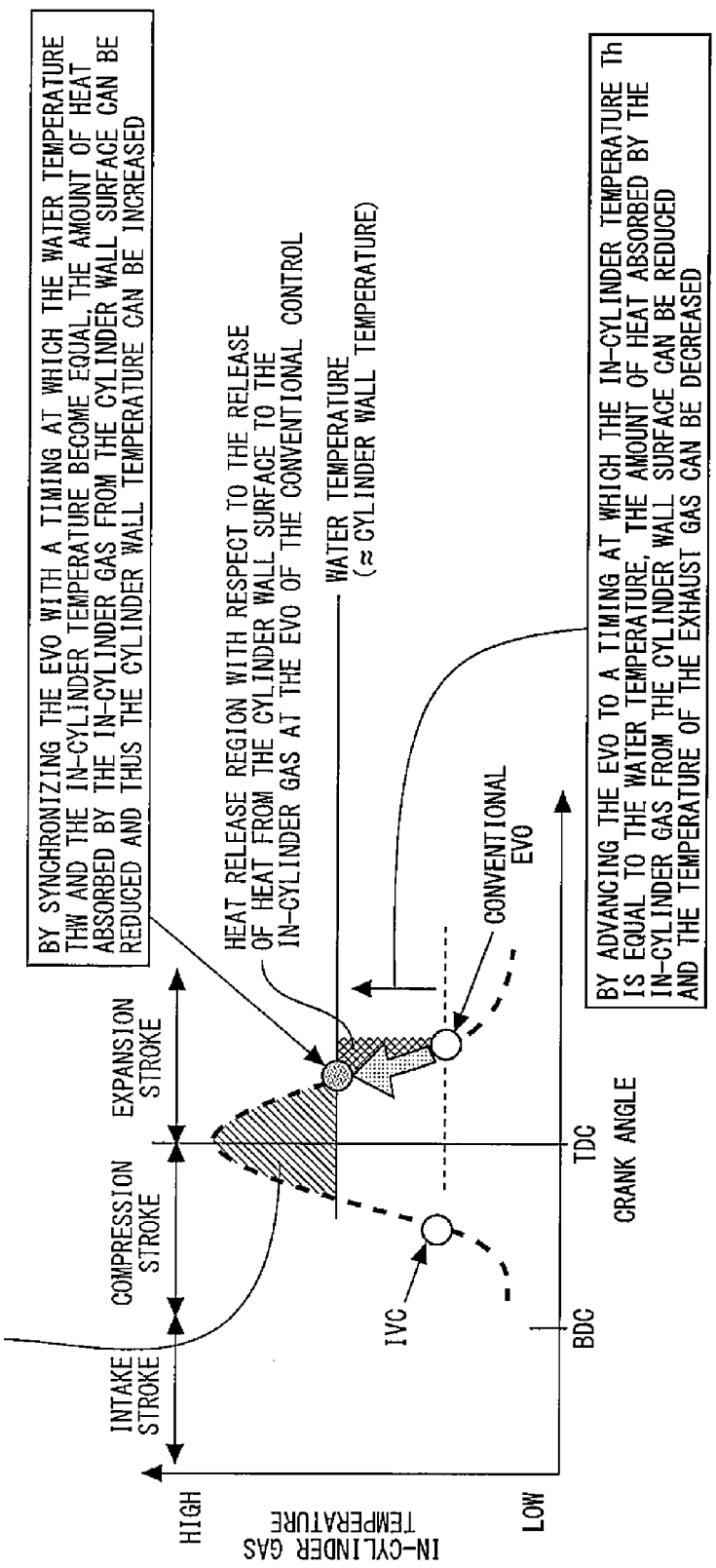
FIG. 12 is an explanatory view that illustrates changes in the in-cylinder gas temperature in a case where the cylinder wall temperature increasing control for a time of a high catalyst temperature was executed.

On the other hand, in FIG. 7, if the result of the determination in step 106 is negative, the process transitions to step 130 to determine whether or not the actual catalyst temperature Ts is higher than the catalyst deterioration temperature T1. If the result determined in step 130 is affirmative, in step 132 it is determined whether or not the water temperature Thw is higher than the required cylinder wall temperature Ty. If the result determined in step 132 is affirmative, that is, if the actual catalyst temperature Ts is higher than the catalyst deterioration temperature T1 and the water temperature Thw is higher than the required cylinder wall temperature Ty, in step 134 cylinder wall temperature increasing control for a time of a high catalyst temperature is executed. According to this control, the EVO is set to a timing at which the water temperature Thw and the in-cylinder temperature become equal. FIG. 12 is an explanatory view that illustrates changes in the in-cylinder gas temperature in a case where the cylinder wall temperature increasing control for a time of a high catalyst temperature was executed. In the figure, a hatched portion in the vicinity of the compression top dead center indicates a heat release region with respect to the release of heat from the in-cylinder gas to the cylinder wall surface according to the conventional control, and a crosshatched portion located in the vicinity of the conventional EVO indicates a heat release region with respect to the release of heat from the cylinder wall surface to the in-cylinder gas at the EVO of the conventional control.

According to the cylinder wall temperature increasing control for a time of a high catalyst temperature, by advancing the EVO to a timing at which the in-cylinder temperature Th is equal to the water temperature, the amount of heat absorbed by the in-cylinder gas from the cylinder wall surface can be reduced and the temperature of the exhaust gas can be decreased. That is, according to the present control, the cylinder wall temperature can be raised and the temperature of the in-cylinder gas and the exhaust gas temperature can be lowered relatively. As a result, the catalyst temperature can be lowered and deterioration of the catalyst can be suppressed. Further, when using a working angle varying-type variable valve mechanism as the exhaust variable valve mechanism 38, working angle enlargement control may be executed by performing the processing in steps 136 and 138 in FIG. 7 that is the same as the processing in steps 112 and 114.

Figure 13:
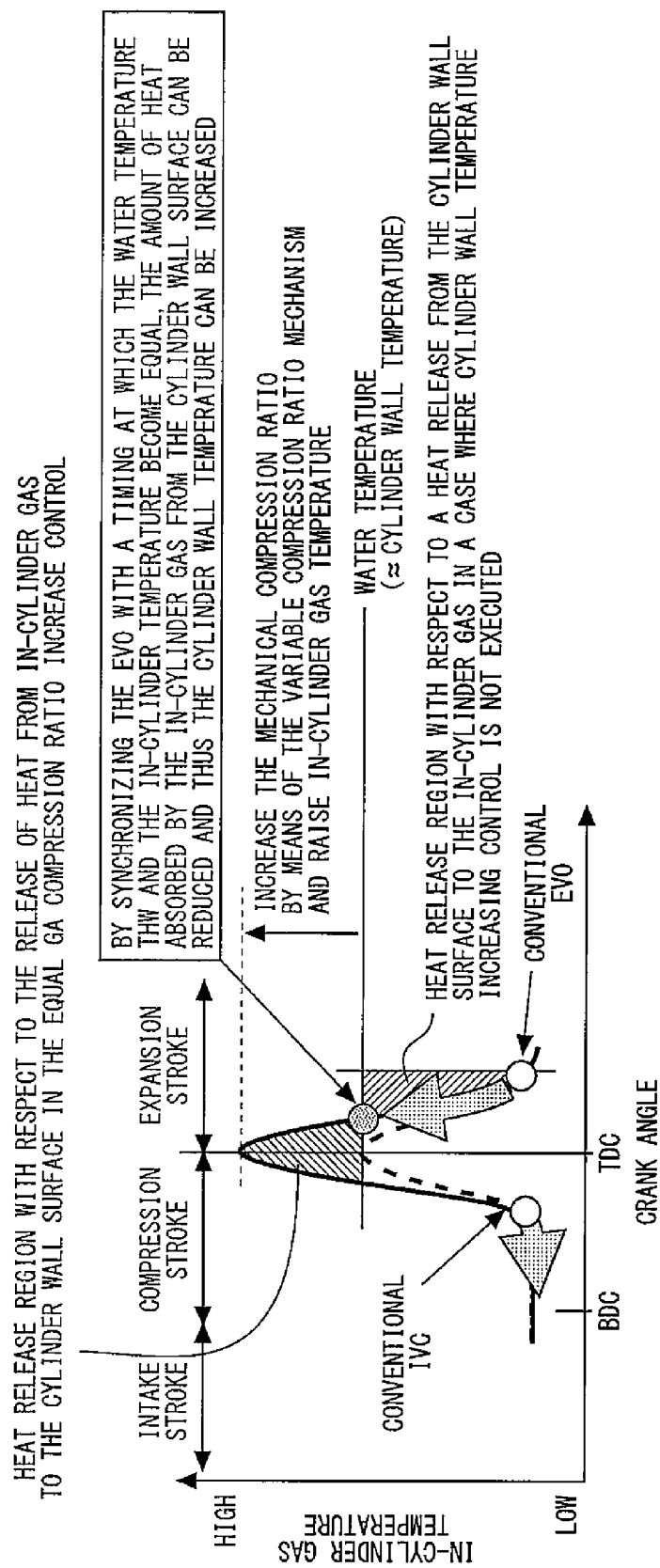
FIG. 13 is an explanatory view that illustrates changes in the in-cylinder gas temperature in a case where the equal GA compression ratio increase control and the cylinder wall temperature increasing control for a time of a high catalyst temperature were executed at the time of a high catalyst temperature.

Further, in a case where the result determined in step 132 is negative, in step 140 it is determined whether or not the mechanical compression ratio is variable. In a case where the variable compression ratio mechanism 40 is mounted in the engine, the result of the determination in step 140 will be affirmative, and hence the equal GA compression ratio increase control is executed in step 142. Further, in step 144, similarly to step 134, the cylinder wall temperature increasing control for a time of a high catalyst temperature is executed. FIG. 13 is an explanatory view that illustrates changes in the in-cylinder gas temperature in a case where the equal GA compression ratio increase control and the cylinder wall temperature increasing control for a time of a high catalyst temperature were executed at the time of a high catalyst temperature. As illustrated in the figure, in step 142, in a case where the actual catalyst temperature Ts is higher than the catalyst deterioration temperature T1 and the water temperature Thw is lower than the required cylinder wall temperature Ty, the mechanical compression ratio is increased by means of the variable compression ratio mechanism 40, and the cylinder wall temperature is raised and the exhaust gas temperature is decreased relatively. Further, in step 144, the EVO is synchronized with a timing at which the water temperature Thw and the in-cylinder temperature become equal. Thus, the cylinder wall temperature and the in-cylinder gas temperature can be raised as described in the foregoing to relatively decrease the exhaust gas temperature, and the catalysts 24 and 26 can be protected from deterioration.

Further, if the result determined in step 140 is negative, the process transitions to step 146 to execute the IVC bottom dead center control. FIG. 14 is an explanatory view that illustrates changes in the in-cylinder gas temperature in a case where the IVC bottom dead center control was executed at the time of a high catalyst temperature. That is, in step 146, in a case where the actual catalyst temperature Ts is higher than the catalyst deterioration temperature T1 and the water temperature Thw is lower than the required cylinder wall temperature Ty, the IVC is set in the vicinity of the intake bottom dead center. According to this control, it is possible to increase the actual compression ratio and raise the in-cylinder gas temperature. It is thereby possible to improve the warm-up characteristics of the catalysts and increase the cylinder wall temperature.

During execution of all of the controls describe above, in step 116 it is determined whether or not a request has been made to revert from the fuel-cut operation. If the result determined in step 116 is affirmative, as described above, first, the engine reverts to normal operation in step 118, and thereafter the fuel-cut operation is terminated in step 120. Thus, according to the temperature balance control, control can be performed that favorably balances both the actual catalyst temperature Ts and the water temperature Thw so that the actual catalyst temperature Ts falls within a temperature range (T1 to T2) that is suitable for operation of the catalysts 24 and 26, and the water temperature Thw becomes close to the required cylinder wall temperature Ty. Therefore, at the time of a fuel-cut operation, it is possible to suppress the occurrence of a situation in which a catalyst deteriorates due to a high temperature or in which a catalyst becomes a low temperature and the exhaust gas emissions deteriorate. Further, the occurrence of a situation in which the combustion state after a fuel-cut operation deteriorates due to an excessive decrease in the cylinder wall temperature can be suppressed.

Note that, in the above described Embodiment 1, step 104 in FIG. 7 represents a specific example of required cylinder wall temperature calculation means according to claim 1 and in-cylinder temperature estimation means according to claim 7, and steps 106 to 144 in FIG. 7 represent a specific example of temperature balance control means according to claim 1. Further, step 110 represents a specific example of low catalyst temperature and high cylinder temperature-time control means according to claim 3, step 124 represents a specific example of temperature increasing means according to claim 5, step 126 represents a specific example of cylinder wall temperature increasing means according to claim 7, and step 128 represents a specific example of temperature increasing means according to claim 6. Further, step 134 represents a specific example of exhaust gas temperature decrease priority means according to claim 8, step 142 represents a specific example of temperature adjustment means according to claim 9, and step 146 represents a specific example of in-cylinder temperature increasing means according to claim 10. Further, FIG. 8 represents a specific example of very low catalyst temperature-time control means according to claim 4.

In the above described Embodiment 1, a case was exemplified of controlling the intake valve 32, the exhaust valve 34, the variable compression ratio mechanism 40 and the like. However, the present invention is a device that controls at least the valve opening characteristics of the exhaust valve 34, and it is not necessarily the case that control of the intake valve 32 and the variable compression ratio mechanism 40 must be performed. Further, according to Embodiment 1 the water temperature Thw has been exemplified as an example of a parameter that corresponds to the cylinder wall temperature. However, the present invention is not limited thereto, and the oil temperature or the like may be used as the cylinder wall temperature.

Further, according to Embodiment 1, a case of detecting the actual catalyst temperature Ts by means of the catalyst temperature sensor 52 was exemplified. However, the present invention is not limited thereto and a configuration may also be adopted in which, for example, the catalyst temperature sensor 52 is not used and the actual catalyst temperature is estimated based on a parameter in which the operating state of the engine is reflected. More specifically, for example, an input energy can be calculated based on an integrated value of the intake air amount (integrated intake air amount) and the exhaust air-fuel ratio, and the catalyst temperature can be estimated based on the input energy. An estimated value of the catalyst temperature calculated in this manner may also be adopted as the actual catalyst temperature Ts.

DESCRIPTION OF REFERENCE NUMERALS

10 engine (internal combustion engine), 12 piston, 14 combustion chamber, 16 crankshaft, 18 intake passage, 20 exhaust passage, 22 throttle valve, 24,26 catalysts, 28 injection valve, 30 spark plug, 32 intake valve, 34 exhaust valve, 36 intake variable valve mechanism (intake valve timing varying mechanism), 38 exhaust variable valve mechanism (exhaust valve timing varying mechanism), 40 variable compression ratio mechanism, 42 crank angle sensor, 44 airflow sensor, 46 water temperature sensor (cylinder wall temperature detection means), 48 main air-fuel ratio sensor, 50 sub-O2 sensor, 52 catalyst temperature sensor (catalyst temperature acquisition means), 54 alcohol concentration sensor (alcohol concentration detection means), 60 ECU (target catalyst temperature setting means), Thw water temperature (cylinder wall temperature), Ts actual catalyst temperature, T1 catalyst deterioration temperature, T2 activity decreasing temperature, Ty required cylinder wall temperature, Th compression-time in-cylinder temperature (in-cylinder temperature)

The invention claimed is:

1. A control device for an internal combustion engine, comprising:
an exhaust purification catalyst that purifies exhaust gas that is discharged from a cylinder of the internal combustion engine;
an exhaust valve timing varying mechanism for variably setting valve opening characteristics of an exhaust valve;
catalyst temperature acquisition unit for detecting or estimating a temperature of the exhaust purification catalyst as an actual catalyst temperature;
target catalyst temperature setting unit for setting a catalyst temperature that is suitable for operation of the exhaust purification catalyst as a target catalyst temperature;
cylinder wall temperature detection unit for detecting a cylinder wall temperature that is a wall surface temperature of the cylinder;
required cylinder wall temperature calculation unit for calculating a cylinder wall temperature that is required when reverting from a fuel-cut operation as a required cylinder wall temperature; and
temperature balance control unit for controlling the valve opening characteristics of the exhaust valve by means of the exhaust valve timing varying mechanism based on a magnitude relation between the actual catalyst temperature and the target catalyst temperature and a magnitude relation between the cylinder wall temperature and the required cylinder wall temperature at a time that a fuel-cut operation is executed.

2. The control device for an internal combustion engine according to claim 1, further comprising:
alcohol concentration detection unit for detecting an alcohol concentration in a fuel;
wherein the required cylinder wall temperature calculation unit is configured so that the higher the alcohol concentration in the fuel is, the higher a temperature that is calculated as the required cylinder wall temperature will be.

3. The control device for an internal combustion engine according to claim 1, wherein:
the target catalyst temperature is set so as to include a predetermined activity decreasing temperature that corresponds to a lower limit value of a range of catalyst temperatures at which the exhaust purification catalyst is activated; and
the temperature balance control unit comprises low catalyst temperature and high cylinder temperature-time control unit for setting an opening timing of the exhaust valve to immediately after a compression top dead center in a case where the actual catalyst temperature is lower than the activity decreasing temperature and the cylinder wall temperature is higher than the required cylinder wall temperature.

4. The control device for an internal combustion engine according to claim 3, further comprising:
an intake valve timing varying mechanism for variably setting valve opening characteristics of an intake valve;
wherein the temperature balance control unit comprises very low catalyst temperature-time control unit for, in a case where a temperature difference between the actual catalyst temperature and the activity decreasing temperature is greater than a predetermined large temperature difference determination value, setting a closing timing of the intake valve in a vicinity of an intake bottom dead center by means of the intake valve timing varying mechanism.

5. The control device for an internal combustion engine according to claim 1, further comprising:
a variable compression ratio mechanism that is capable of variably setting a mechanical compression ratio of the cylinder;
wherein the temperature balance control unit comprises temperature increasing unit for, in a case where the actual catalyst temperature is lower than the activity decreasing temperature and the cylinder wall temperature is lower than the required cylinder wall temperature, increasing the mechanical compression ratio by means of the variable compression ratio mechanism to increase a gas temperature in the cylinder and the cylinder wall temperature.

6. The control device for an internal combustion engine according to claim 1, wherein:
the temperature balance control unit comprises temperature increasing unit for, in a case where the actual catalyst temperature is lower than the activity decreasing temperature and the cylinder wall temperature is lower than the required cylinder wall temperature, setting a closing timing of the intake valve in a vicinity of an intake bottom dead center and increasing a gas temperature in the cylinder and the cylinder wall temperature.

7. The control device for an internal combustion engine according to claim 5, further comprising:
in-cylinder temperature estimation unit for estimating an in-cylinder temperature that is a temperature in the cylinder at a compression top dead center based on at least an alcohol concentration in a fuel;
wherein the temperature balance control unit comprises cylinder wall temperature increasing unit for setting an opening timing of the exhaust valve to a timing at which the cylinder wall temperature and the in-cylinder temperature become equal.

8. The control device for an internal combustion engine according to claim 1, wherein:
the target catalyst temperature is set so as to include a predetermined catalyst deterioration temperature that corresponds to a lower limit value of a catalyst temperature range in which deterioration of the exhaust purification catalyst progresses; and
the temperature balance control unit comprises exhaust gas temperature decrease priority unit for, in a case where the actual catalyst temperature is equal to or greater than the catalyst deterioration temperature and the cylinder wall temperature is higher than the required cylinder wall temperature, setting an opening timing of the exhaust valve to a timing at which the cylinder wall temperature and the in-cylinder temperature become equal.

9. The control device for an internal combustion engine according to claim 1, further comprising:
a variable compression ratio mechanism for variably setting a mechanical compression ratio of the cylinder;
wherein the temperature balance control unit comprises temperature adjustment unit for, in a case where the actual catalyst temperature is equal to or greater than the catalyst deterioration temperature and the cylinder wall temperature is lower than the required cylinder wall temperature, increasing the mechanical compression ratio by means of the variable compression ratio mechanism to increase the cylinder wall temperature and decrease an exhaust gas temperature.

10. The control device for an internal combustion engine according to claim 1, further comprising:
an intake valve timing varying mechanism for variably setting valve opening characteristics of an intake valve;
wherein the temperature balance control unit comprises in-cylinder temperature increasing unit for, in a case where the actual catalyst temperature is greater than or equal to the catalyst deterioration temperature and the cylinder wall temperature is lower than the required cylinder wall temperature, setting a closing timing of the intake valve in a vicinity of an intake bottom dead center by means of the intake valve timing varying mechanism.

* * * * *